(12) United States Patent
Maurer et al.

(10) Patent No.: US 8,563,105 B2
(45) Date of Patent: *Oct. 22, 2013

(54) WATER-SOLUBLE FILM WITH RESISTANCE TO SOLUBILITY PRIOR TO BEING IMMERSED IN WATER

(75) Inventors: Joshua Allen Maurer, Bay City, MI (US); Frank William DeNome, Cincinnati, OH (US); Bruno Jean-Pierre Matthys, Brussels (BE); Hanif Badouraly, Paris (FR)

(73) Assignee: The Procter & Gamble Company, Cincinnati, OH (US)

( * ) Notice: Subject to any disclaimer, the term of this patent is extended or adjusted under 35 U.S.C. 154(b) by 473 days.

This patent is subject to a terminal disclaimer.

(21) Appl. No.: 11/336,273

(22) Filed: Jan. 20, 2006
(Under 37 CFR 1.47)

(65) Prior Publication Data
US 2006/0216424 A1    Sep. 28, 2006

Related U.S. Application Data

(60) Provisional application No. 60/646,454, filed on Jan. 22, 2005.

(51) Int. Cl.
*B32B 1/08* (2006.01)
(52) U.S. Cl.
USPC .......................................... 428/35.7; 428/35.4
(58) Field of Classification Search
USPC ............... 428/35.4, 35.7, 350, 412, 522, 913; 422/56
See application file for complete search history.

(56) References Cited

U.S. PATENT DOCUMENTS

| 3,528,921 A | | 9/1970 | Frederick |
| 3,654,928 A | * | 4/1972 | Duchane ....................... 604/364 |
| 3,886,112 A | | 5/1975 | Watson et al. |
| 4,258,849 A | * | 3/1981 | Miller ........................... 206/210 |
| 5,151,193 A | * | 9/1992 | Grobe et al. ................... 210/651 |
| 5,272,191 A | * | 12/1993 | Ibrahim et al. .................. 524/35 |
| 5,429,874 A | | 7/1995 | VanPutte |
| 5,439,745 A | | 8/1995 | Ohba et al. |
| 6,660,704 B1 | | 12/2003 | Waschenbach et al. |
| 2004/0030034 A1 | | 2/2004 | Chang et al. |
| 2006/0165625 A1 | | 7/2006 | Verrall et al. |
| 2008/0146481 A1 | | 6/2008 | Brown et al. |

FOREIGN PATENT DOCUMENTS

| CA | 2042700 C | 4/2010 |
| JP | A-S51-013868 | 7/1974 |
| JP | A-2003-171521 | 6/2003 |
| JP | A-2002-241797 | 8/2008 |
| JP | A-2002-241799 | 8/2008 |
| WO | WO 03/076513 | 9/2003 |

OTHER PUBLICATIONS

U.S. Appl. No. 11/336,507, filed Jan. 20, 2006, Maurer, et al.
Final Office Action for U.S. Appl. No. 11/983,999, dated Jan. 26, 2009.
Nonfinal Office Action for U.S. Appl. No. 11/983,999, dated May 13, 2008.

* cited by examiner

*Primary Examiner* — Erik Kashnikow
(74) *Attorney, Agent, or Firm* — Matthew P. Fitzpatrick; Steven W. Miller

(57) ABSTRACT

A water-soluble film that is resistant to contact with small amounts of water and methods of making the same from water-soluble film-forming compositions, such as polyvinyl alcohols having a salt applied to a surface of the film and a method of making articles made therefrom.

5 Claims, 1 Drawing Sheet

WATER-SOLUBLE FILM WITH RESISTANCE TO SOLUBILITY PRIOR TO BEING IMMERSED IN WATER

CROSS-REFERENCES

This application claims priority under 35 U.S.C. §119(e) to U.S. provisional application No. 60/646,432, filed Jan. 22, 2005.

FIELD OF THE INVENTION

This invention relates to a water-soluble film, and more particularly a water-soluble film that is resistant to contact with small amounts of water, and methods of making the same. This invention also relates to articles, such as pouches, made from the water-soluble film.

BACKGROUND OF THE INVENTION

Water-soluble films are gaining wider acceptance for use as packaging materials. Packaging materials include films, sheets, blown or molded hollow bodies (i.e. sachets, pouches, and tablets), bottles, receptacles and the like. Often water-soluble films, when used in the preparation of certain types of these articles, such as sachets and pouches, leak and/or become sticky when exposed to small amounts of water contamination or high humidity, which can make them unsuitable for usage in the packaging and preservation of the compositions contained therein.

The most common consumer complaints for water-soluble pouches are linked to unwanted pouch dissolution when accidentally exposed to water, such as when water gets inside the outer packaging in which the pouches are sold and stored after purchase, from wet hands, high humidity, leaking sinks, or pipes during storage, etc. This may cause the water-soluble pouches to leak prior to use and/or stick together. The second most frequent complaint is that of the water-soluble pouch failing to fully dissolve upon use. Thus, there remains an unmet need for water-soluble films and pouches that can resist dissolution and/or leakage after exposure to small amounts of water yet can subsequently dissolve very quickly when immersed in an aqueous solution, such as rinse and/or wash water.

It has been known since the 1960s that certain salts, when added to polyvinyl alcohol (PVOH) solutions, may cause the PVOH to precipitate. These salts are generally seen as being useful for solidifying aqueous PVOH. Another disclosure of the use of salts in water soluble films is in U.S. Pat. No. 5,429,874, VanPutte. The VanPutte patent is directed to a water soluble film suitable for packaging caustic chemicals that has an outer layer of a water soluble polymeric material, and an inner layer of polymeric material which is compatible with the contents of a package made from the film. An intermediate layer can optionally be included to contribute to the tensile strength, bulk, abuse resistance, or some other property of the film. Water soluble fillers such as salt can optionally be added to one or more of the polymeric materials, prior to or during extrusion of the film, to improve the processability of the film or its rate of dissolution in water, or to add a pigment to the film.

It is known that when untreated pouch surfaces are exposed to droplets of water, these untreated pouch surfaces tend to dissolve and/or leak. However, it was surprisingly found that when a $Na_2SO_4$ solution is applied to the outside surface of a PVOH pouch, and the outside surface of the pouch is exposed to small amounts of water, the treated pouch does not substantially dissolve and/or leak. Rather, when the treated pouch is exposed to small amounts of water, it exhibits reduced leakage and increased resistance to pouch-to-pouch stickiness.

By adding particular salts to the outside surface of a water-soluble (esp. polyvinyl alcohol) film, resistance to exposure from small amounts water (i.e. wet hands, droplets) can be achieved while not appreciably affecting the water-soluble pouch dissolution profile when the product is immersed in an aqueous solution (e.g. water bath). Incorporating the salt into the outermost part of the water-soluble film can be achieved in a variety of ways that includes conventional powdering, coating, casting, or other methods used in the production of films. The salt concentration may be adjusted to achieve the desired dissolution properties and to optimize pouch aesthetics. The water-soluble film described herein can be used in the production of any pouched product, such as for example, pouches containing: laundry detergent compositions, automatic dishwashing detergent compositions, hard surface cleaners, fabric enhancers and/or fabric softeners, and new product forms where contact with small amounts of water could create premature pouch dissolution, unwanted pouch leakage and/or undesirable pouch-to-pouch stickiness.

SUMMARY OF THE INVENTION

This invention relates to a water-soluble film and more particularly a water-soluble film that is resistant to contact with small amounts of water, and methods of making the same. The water-soluble film may, however, be substantially water-soluble when immersed in water. This invention also relates to articles, such as pouches, made from the water-soluble film described herein.

There are numerous non-limiting embodiments of the water-soluble film described herein. In one non-limiting embodiment, the present invention comprises a water-soluble film that is resistant to solubility prior to being immersed in an aqueous solution (e.g. water). The water-soluble film has a first surface, a second surface, and a thickness between the first and second surfaces. In this embodiment, the water-soluble film comprises a water-soluble film-forming composition comprising at least some polyvinyl alcohol and a salt that is distributed more closely to at least one of the first and second surfaces than throughout the thickness of the water-soluble film. The salt can be disposed in any one or more of a number of locations, including the following locations: on one of the surfaces of the water-soluble film; within the water-soluble film between the surfaces of the same in a location that is distributed more closely to at least one of the first and second surfaces than throughout the thickness of the water-soluble film; or incorporated into an outer layer of a multi-layer film.

There are numerous non-limiting embodiments of the method of making the water-soluble film described herein. In one embodiment, the method comprises providing a film and applying a salt to at least one of the surfaces of the water-soluble film. The salt can be applied in a number of different manners. In one version of this embodiment, the salt is applied in the form of a powder. In another version of this embodiment of the method, the salt is provided in the form of a solution that is applied onto at least one surface of the water-soluble film. These embodiments of the method may further comprise a step of wetting at least a portion of the surface of the water-soluble film prior to applying a salt to the surface of the water-soluble film.

In another embodiment, the method of making the water-soluble film comprises the steps of: (a) forming a water-soluble film-forming composition; (b) adding a salt to the water-soluble film-forming composition; and (c) forming a film from the water-soluble film-forming composition with the salt therein.

In another embodiment, the method of making the water-soluble film comprises the steps of: (a) providing a first water-soluble film-forming composition, the first film-forming composition comprising a first concentration of a salt; (b) forming a first film from the first water-soluble film-forming composition; (c) providing a second water-soluble film-forming composition, the second film-forming composition comprising less salt than the first water-soluble film-forming composition, or being substantially, or completely, free of salt; and (d) forming a second film from the second water-soluble film-forming composition wherein the second film is combined with the first film.

The present invention also relates to articles, such as pouches, made from the water-soluble film. The surface of the water-soluble film having the salt distributed more closely thereto may form an outside surface of the article. In one non-limiting embodiment, the present invention comprises a product comprising the water-soluble film which contains a unit dose of a composition. The product can comprise a unit dose of a composition for use in laundry, hard surface cleaning, hand dishwashing, automatic dishwashing, fabric enhancers (e.g. softeners, brighteners, etc.), or any other application that utilizes water soluble films that are susceptible to contact by small amounts of water prior to use. In other embodiments, such a product may have the film oriented or formed in such a way so that at least one side of the film with the salt distributed therein or thereon forms an inside surface of the article to provide resistance to leakage from any aqueous compositions contained in the product.

BRIEF DESCRIPTION OF THE DRAWINGS

While the specification concludes with claims particularly pointing out and distinctly claiming the subject matter which is regarded as forming the present invention, it is believed that the invention will be better understood from the following description taken in conjunction with the accompanying drawings, in which:

DETAILED DESCRIPTION OF THE INVENTION

This invention relates to a water-soluble film and more particularly a water-soluble film that is resistant to contact with small amounts of water, and methods of making the same. The water-soluble film may, however, be substantially water-soluble when immersed in water. This invention also relates to articles, such as water-soluble pouches, made from the water-soluble film described herein.

As used herein, the term "water-soluble" not only refers to a film structure which is totally water-soluble, but also includes films which are substantially water-soluble but have material(s) in the water-soluble film structure which are not water-soluble; films with materials which are water-soluble only at relatively high water temperatures or only under limited pH conditions; and films which include some amount of water-insoluble material, such as a relatively thin layer of water-insoluble material.

As used herein, the term "resistant to contact" (or "resistant to solubility") refers to water-soluble films that have a reduction or elimination in areas thereof that prematurely dissolve when contacted by small amounts of water. For example, packages, such as pouches, made from a water-soluble film that is resistant to solubility will have a reduced tendency to leak or stick together after being contacted by small amounts of water.

As used herein, the term "small amounts of water" refers to amounts of water that are less than sufficient to fully immerse the water-soluble film.

Water-Soluble Film

Figure 1:
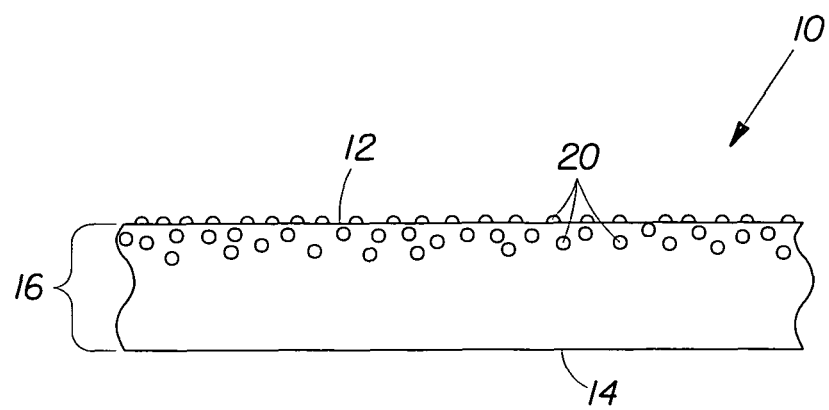
FIG. 1 is a fragmented schematic side view of a portion of a film having a salt disposed on one of the outside surfaces of the same.

FIG. 1 shows one non-limiting embodiment of a water-soluble film 10. The water-soluble film 10 has a first surface 12, a second surface 14, and a thickness 16 between the first surface 12 and the second surface 14. In this embodiment, the water-soluble film 10 comprises a water-soluble film-forming composition and a salt 20. The salt 20 is distributed more closely to at least one of the first and second surfaces than throughout the thickness 16 of the water-soluble film 10. For purposes of illustration, the salt 20 is shown in the drawings in the form of discrete particles, or a layer of particles. It should be understood, however, that in some embodiments (such as the embodiment shown in FIG. 2 in which the salt is incorporated into the film-forming composition, discussed below) although the salt 20 is shown as being in the form of particles, the salt 20 may, alternatively, be a part of a homogeneous film layer or layers, and the salt may no longer comprise identifiable particles.

In some embodiments, the salt 20 may be distributed relatively uniformly on or adjacent to, at least one of the surfaces of the water-soluble film 10. In other embodiments, the salt 20 may be distributed randomly on or adjacent to, at least one of the surfaces of the water-soluble film 10. In some embodiments, the thickness 16 of the film 10 may be substantially free of salt 20. In other embodiments, some salt 20 (a minority of the total amount of salt) may also be distributed within the thickness 16 of the water-soluble film 10. Such a minority of the salt may be distributed randomly within the thickness 16 of the film, or, alternatively, in a regular manner therein. In other embodiments, the salt 20 may be distributed in the form of a gradient where a higher concentration of salt 20 is found on, or adjacent to, at least one of the surfaces of the water-soluble film 10 than throughout the thickness 16 of the water-soluble film 10.

In order to provide the desired protection from resistance to accidental exposure to water, the salt 20 can be distributed more closely to the surface of the water-soluble film 10 that is most likely to be exposed to such water (i.e. the surface that will lie on the outside of any product made from the water-soluble film 10). The salt 20 can be disposed in any one or more of the following locations on the water-soluble film 10: on the first surface 12 of the water-soluble film 10; on the second surface 14 of the water-soluble film 10; within the water-soluble film 10 between the first surface 12 and the second surface 14 in a location that is distributed more closely to at least one surface, such as nearer the first surface 12 and/or the second surface 14; or incorporated into an outer layer of a multi-layer water-soluble film.

The water-soluble film 10 can comprise a number of suitable water-soluble materials. In one embodiment, the water-soluble film comprises a water-soluble film-forming composition comprising at least some polyvinyl alcohol (or "PVA" or "PVOH") and a salt. In some embodiments, the water-soluble film 10 can be comprised substantially entirely of PVOH, one or more salts, and one or more additive ingredients. In other embodiments, the water-soluble film 10 can consist essentially of PVOH, one or more salts, and one or more additive ingredients. In other embodiments, however, the water-soluble film 10 can comprise a mixture of PVOH and other suitable water-soluble or water dispersible materials, one or more salts, and one or more additive ingredients. Suitable water-soluble materials include, but are not limited to polymers, copolymers and derivatives thereof.

Suitable water-soluble film materials that can be used in addition to PVOH include, but are not limited to: polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum, polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, PVOH copolymers, hydroxypropyl methyl cellulose (hereinafter "HPMC"), and mixtures thereof.

Mixtures of polymers can be beneficial to control the mechanical and/or dissolution properties of the film, depending on the application thereof and the required needs. Suitable mixtures include, for example, mixtures where one polymer has a higher water-solubility than another polymer, and/or one polymer has a higher mechanical strength than another polymer and/or mixtures of polymers having different weight average molecular weights. Also suitable for use in the film described herein are polymer blend compositions, for example comprising hydrolytically degradable and water-soluble polymer blends such as polylactide and polyvinyl alcohol, obtained by mixing polylactide and polyvinyl alcohol, typically comprising about 1-35% by weight polylactide and about 65% to 99% by weight polyvinyl alcohol.

Commercially available film materials can also be modified by adding salt thereto as described herein. Suitable commercially available film materials that can be modified by adding salt thereto as described herein, are PVA films known as MONOSOL M8630™ film, sold by MonoSol, LLC of Gary, Ind., U.S.A., and PVOH films of corresponding solubility and deformability characteristics. MonoSol water-soluble films are described in U.S. Pat. Nos. 3,374,195 and 3,413,229 issued to Bianco, et al., and U.S. Pat. No. 6,787,512 B1 issued to Verrall, et al. Other films suitable for being modified for use herein include: PT™ film or the K-series of films supplied by Aicello Chemical Co., Ltd., Aichi, Japan; VF-HP film supplied by Kuraray Co., Ltd., Tokyo, Japan; and HI-SELON™ film supplied by The Nippon Synthetic Chemical Industry Co., Ltd., Osaka, Japan. One particular Nippon Synthetic Chemical Industry Co. water-soluble film is described in European Patent Publication EP 1158016 A2.

The water-soluble film 10 can comprise any suitable amount of PVOH and other suitable water-soluble or water dispersible materials. When the water-soluble film 10, or the water-soluble film-forming composition, is described herein as including PVOH and other water-soluble or water dispersible materials, this refers to water-soluble or water dispersible polymeric material, including polymers, copolymers, terpolymers, and water-soluble film materials described above (which may be referred to herein as the "primary film material" (or materials)), and does not include salt, plasticizer, water, or other additive ingredients. In some embodiments, the water-soluble film 10 comprises from about 50% to about 95% of primary film materials, such as PVOH and other suitable water-soluble or water dispersible materials (on a dry basis in the finished film). Unless otherwise stated, all percentages set forth herein are by weight.

The film 10 may comprise any suitable salt 20. Suitable salts 20 may include organic or inorganic electrolytes. Suitable salts 20 may include a cation or mixtures of cations selected from the following group: aluminum, ammonium, antimony, barium, bismuth, cadmium, calcium, cesium, copper, iron, lithium, magnesium, nickel, potassium, rubidium, silver, sodium, strontium, zinc and zirconium; and an anion or mixture of anions selected from the following group: acetate, aluminum sulfate, azide, bicarbonate, bisulfite, borohydride, borooxalate, bromate, bromide, carbonate, chloride, chlorite, chromate, cyanate, cyanide, dichromate, disilicate, dithionate, ferricyanide, ferrocyanate, ferrocyanide, fluoride, fluoroantimonate, fluoroborate, fluorophosphate, fluorosulfonate, fluorosilicate, hydrogen carbonate, hydrogen sulfate, hydrogen sulfite, hydrogencyanide, hydrogen phosphate, hydrogen sulfate, hydrosulfite, hydroxide, hydroxystannate, hypochlorite, hyponitrite, hypophosphite, iodate, iodide, manganate, meta-aluminate, metaborate, metaperiodate, metasilicate, mixed halides, molybdate, nitrate, nitrite, orthophosphate, orthophosphite, orthosilicate, oxalate, oxalatoferrate, oxide, perborate, perchlorate, permanganate, peroxide, peroxydisulfate, phosphate, polybromide, polychloride, polyfluoride, polyiodide, polyphosphate, polysulfide, pyrosulfate, pyrosulfite, sesqui-carbonate, silicate, stannate, sulfamate, sulfate, sulfide, sulfite, thiocyanaate or thiosulfate.

Other suitable salts include cations such as substituted ammonium ions $R_4N$ (with R=hydrogen or $C_{1-6}$ alkyl, substituted or unsubstituted). Other suitable types of anions include carboxylates, formate, citrate, maleate, tartrate, etc. Suitable salts may comprise $C_{1-9}$ alkyl carboxylic acids; polymeric carboxylates (polyacrylates, polymaleates); short chain ($C_{1-9}$) alkylphosphates, alkylphosphonates; and short chain ($C_{1-9}$) alkyl sulfates and alkylsulphonates.

FIG. 1 shows that the salt 20 may be disposed on at least one of the surfaces of the film 10, such as surface 12. FIG. 1 also shows that the salt 20 may be incorporated into the film 10. The salt 20 can be distributed in any suitable thickness on or within the film 10, or both. The thickness of the salt 20 (or more specifically, the thickness of the "salt distribution") may be expressed in terms that are relative to the total film thickness 16. The total film thickness 16 may, for example, range from about 0.5-5 mils (or from about 12 or 13 microns to about 125 microns). (In other embodiments, however, the total film thickness may be less than 0.5 mils, or greater than 5 mils.) In some embodiments, the thickness of the salt distribution may range from about 1% to about 80% of the total film thickness. If the salt 20 is distributed within the film 10, the salt 20 may be located in any suitable location within the film. For example, the salt 20 may be located within from about 1% to about 50%, from about 1% to about 40%, from about 1% to about 30%, from about 1% to about 20%, from about 1% to about 15% of the total film thickness of at least one of the surfaces of the water-soluble film 10. It should be understood that the percentages provided herein refer to where the salt 20 is primarily distributed, and that it is also possible that small amounts of salt may be distributed elsewhere within the film 10.

To make a film 10 with the salt 20 distributed as shown in FIG. 1, the salt 20 may be applied to a film, or incorporated into the film 10 in a number of different manners. Methods for making the film are described in detail in the following section. However, some mention will be made here of some of these methods as they relate to the amount of salt 20 that may be applied to a film, or incorporated into the film 10. If the salt 20 is applied to a surface of the film 10 in powder form, then it can be applied until an excess of powder (i.e., an amount that would not remain on the film) is formed on the surface of the film 10. In other embodiments, the salt 20 may be incorporated into a solution that is applied to the surface of a film. A suitable salt solution for the water-soluble film-forming composition may be comprised of any suitable molar concentration of salt. Suitable molar concentrations of a salt in solution may include, but are not limited to: from about 0.01M to about 10 M, from about 0.1M to about 5 M, and alternatively from about 0.5M to about 4M salt in an aqueous solution. Suitable molar concentrations of a salt in solution may be adjusted differently for different salts. For example, a molar concentration as low as about 0.25 M may be suitable for sodium sulfate, and a molar concentration as low as about 0.03 may be suitable for some Al salts. In other embodiments, the salt 20 may be incorporated directly into any suitable water-soluble film-forming composition by mixing a suitable salt into the film-forming composition (e.g. PVOH composition, which may be an aqueous composition) in any suitable manner as described in the following section. In certain non-limiting embodiments, an effective amount of a salt may be defined as the following amounts: from about 0.1% to about 50%; from about 0.5% or about 1% to about 15, 20, or 25%; and, alternatively from about 0.5% to about 15% by weight of the film (on a dry basis after the film is formed). If a film-forming composition is being modified to form a water-soluble film according to the present invention, the salt may replace an equivalent amount, by weight, of PVOH (or other primary film material) in the composition.

The water-soluble film-forming composition and the water-soluble film 10 formed therefrom can also comprise one or more additive or adjunct ingredients. For example, the water-soluble film-forming composition and the water-soluble film 10 may contain: water, plasticizers, lubricants, release agents, fillers, extenders, anti-blocking agents, detackifying agents, antifoams, or other functional ingredients. The latter may, in the case of articles containing compositions for washing, include, but are not limited to functional detergent additives to be delivered to the wash water, for example organic polymeric dispersants, or other detergent additives.

The water-soluble film 10 may, thus, comprise water, or other volatile ingredients. Water or other volatile ingredients may be present in the film in any suitable amount. Suitable amounts include, but are not limited to in a range of from about 1-20%, by weight of the water-soluble film after the film has been formed and preconditioned for 24 hours at 21° C. and 50% Relative Humidity.

The water-soluble film 10, as noted above, may comprise a plasticizer. Suitable plasticizers include, but are not limited to: glycerol, glycerin, diglycerin, hydroxypropyl glycerine, sorbitol, ethylene glycol, diethylene glycol, triethylene glycol, tetraethylene glycol, propylene glycol, polyethylene glycols, neopentyl glycol, trimethylolpropane, polyether polyols, ethanolamines, and mixtures thereof.

In one non-limiting embodiment, the plasticizer may comprise a combination of hydroxypropyl glycerine and a low molecular weight polyethylene glycol with a hot (140° F. (about 49° C.)) and cold (75° F. (about 24° C.)) water soluble film-forming polyvinyl alcohol such as is described in U.S. Pat. No. 3,374,195 issued to Bianco, et al. In certain versions of such an embodiment, the polyvinyl alcohol employed is prepared by replacement of about 80%-95%, or 85%-90%, of the acetate groups of polyvinyl acetate by hydroxyl groups. In these embodiments, the aqueous film-forming composition may comprise any suitable amount of polyvinyl alcohol (for example, about 20-40% of the aqueous film-forming composition). The polyvinyl alcohol may have a viscosity in 4% aqueous solution at 20° C. of at least about 20 centipoises, or between about 20-45 Cps. The hydroxypropyl glycerine may be 1-methyl-2-hydroxyethyl glyceryl ether where an average of at least about 2.5, or alternatively 3, of the hydroxyl radicals of glycerine are etherified or substituted by the hydroxylpropyl (1-methyl-2-hydroxyethyl) radicals. The polyethylene glycol may have a weight average molecular weight of between about 200-600, or alternatively between about 200-300. In one non-limiting embodiment, the composition contains polyvinyl alcohol and, in percentages by weight of the polyvinyl alcohol content, about 7-17% of hydroxypropyl glycerine, and about 10-20% of polyethylene glycol. The total proportion of the plasticizer combination of hydroxypropyl glycerine and polyethylene may be between about 22-32% of the aqueous film-forming composition. For example, about 12% of hydroxypropyl glycerine and about 15% of polyethylene glycol may be used.

In another embodiment, such as is described in MonoSol's U.S. Pat. No. 6,787,512 B1 issued to Verrall, et al., a plasticizer may comprise one or more of the following: glycerin, triethyleneglycol, propylene glycol, and trimethylolpropane. The plasticizer can be incorporated in the water-soluble film 10 in any suitable amount including, but not limited to amounts in the range of from about 5% to about 30% by weight, or in the range of from about 12% to about 20% by weight of the aqueous film-forming composition.

Suitable surfactants may include the nonionic, cationic, anionic and zwitterionic classes. Suitable surfactants include, but are not limited to, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), and amine oxides, N-alkylbetaines and sulfobetaines (zwitterionics). The surfactant can be incorporated in the water-soluble film 10 in any suitable amount including, but not limited to amounts in the range of from about 0.01% to about 1% by weight, or in the range of from about 0.1% to about 0.6% by weight of the aqueous film-forming composition.

Suitable lubricants/release agents include, but are not limited to, fatty acids and their salts, fatty alcohols, fatty esters, fatty amines, fatty amine acetates and fatty amides. The lubricant/release agent can be incorporated in the water-soluble film 10 in any suitable amount including, but not limited to amounts within the range of from about 0.02% to about 1.5% by weight, or in the range of from about 0.04% to about 0.15% by weight of the aqueous film-forming composition.

Suitable fillers, extenders, antiblocking agents, detackifying agents include, but are not limited to: starches, modified starches, crosslinked polyvinylpyrrolidone, crosslinked cellulose, microcrystalline cellulose, silica, metallic oxides, calcium carbonate, talc and mica. The filler, extender, antiblocking agent, detackifying agent can be present in the water-soluble film 10 in any suitable amount including, but not limited to amounts in the range of from about 0.1% to about 25% by weight, or in the range of from about 1% to about 15% by weight of the aqueous film-forming composition. In the absence of starch, it may be desirable for the filler, extender, antiblocking agent, detackifying agent to be present in a range of from about 1% to about 5% by weight of the aqueous film-forming composition.

Suitable antifoams include, but are not limited to, those based on polydimethylsiloxanes and hydrocarbon blends. The antifoam can be present in the water-soluble film 10 in any suitable amount including, but not limited to, in the range of from about 0.001% to about 0.5%, or in the range of from about 0.01% to about 0.1% by weight of the aqueous film-forming composition.

The composition is prepared by mixing the materials and agitating the mixture while raising the temperature from about 70° F. (about 21° C.) to 195° F. (about 90° C.) until solution is complete. The film-forming composition may be made into any suitable form (e.g. film or sheets) and may then be subsequently formed into any suitable product (e.g. single- and multiple-compartment pouches, sachets, bags, etc.).

Methods of Making a Water-Soluble Film

There are numerous non-limiting embodiments of the method of making the water-soluble film 10 described herein.

In one embodiment, the method comprises providing a previously formed water-soluble film and applying a salt to at least one of the surfaces of the previously formed water-soluble film. (The previously formed water-soluble film may be a water-soluble film that is unmodified by having added salt to the composition used to form the film.) Such a method can be used to provide salt 20 on the outside surface of the film 10 shown in FIG. 1.

The salt 20 can be applied to the previously formed water-soluble film in a number of different manners. In one non-limiting embodiment, the salt is applied to at least one of the surfaces of the previously formed water-soluble film in the form of a powder (in particles or granules). The salt particles can be of any suitable size. For example, the sodium sulfate powder can have an average particle size of from about 1 micron to about 500 microns; from about 1 micron to about 300 microns, or alternatively, less than or equal to about 150 microns. Several non-limiting examples of suitable size salt particles are those which pass through number 120 and 270 size sieves. The amount of salt added to the previously-formed water-soluble film can be expressed in terms of the amount of salt added onto the film as a percentage of the initial film weight (before the salt is added). The amount of salt that can be added to the film in such an embodiment can be in any suitable range including, but not limited to between about 0.01% and about 50%, or more, or between about 2.5% and about 20%, or between about 2.5% and about 7%, by weight of the film. In such embodiments, greater amounts of salt can be applied to the film since applying salt to the surface of a film will not be as likely to undesirably alter certain properties of the film, especially the mechanical properties of the same, as will incorporating salt into a film-forming composition.

In another non-limiting embodiment of the method, the salt is provided in the form of a solution that is applied onto at least one of the surfaces of the water-soluble film. The solution can be applied to at least one of the surfaces of the water-soluble film in any suitable manner including, but not limited to, by spraying and/or printing the same onto at least one of the surfaces of the water-soluble film. The solution can comprise a mixture of any suitable amount of salt and water. For example, the solution can comprise from about a 0.01M to about a 1.25M, or greater, solution of salt and water. In one non-limiting embodiment, the solution comprises at least a 0.5M $Na_2SO_4$ solution. Such a solution may be formed by mixing at least 6.6% of $Na_2SO_4$ in water. The film with the salt solution thereon is then allowed to dry, or undergoes a drying process. The concentration of salt in the solution can also be established so that after the film with the salt solution thereon is allowed to dry, or undergoes a drying process, the level of salt in the remaining water is within the above ranges, for example, the salt in the dried coating on the surface of the film may be in a concentration of at least about 0.5M to about 1.25M, or more.

These embodiments may also comprise a step of wetting at least a portion of at least one of the surfaces of the water-soluble film prior to applying a salt to the previously formed water-soluble film. The wetting of the surface of the water-soluble film may be used to at least partially dissolve or solubilize an outer portion of the surface of the film (that is, part of the way into the thickness of the film). The water-soluble film may be at least partially solubilized to any desired depth. Suitable depths include, but are not limited to: from about 1% to about 40% or about 45%, from about 1% to about 30%, from about 1% to about 20%, from about 1% to about 15%, and alternatively, from about 1% to about 10% of the overall film thickness. Salt is then applied to the partially dissolved portion of the surface of the film. This allows the salt to be embedded into an outer portion of the surface of the film, and to become a more permanent part of the film. The wetted surface of the film with the salt embedded into the same is then permitted to dry. Such an embodiment of the method may also comprise a step of removing at least some of any loose or excess salt remaining on the surface of the water-soluble film after it dries, such as by wiping or dusting the surface of the film.

In another embodiment, the method of making the water-soluble film 10 comprises the steps of: (a) providing a water-soluble film-forming composition; (b) adding a salt to the water-soluble film-forming composition; and (c) forming a film from the mixture comprising the water-soluble film-forming composition with the salt therein. In such an embodiment, including the multi-layer embodiments described below, the salt 20 can be added in any suitable weight percentage of the film. Suitable percentages include, but are not limited to: up to about 20%; less than or equal to about 20%, and from about 1% to about 15% of the film, without adversely affecting the properties of the film 10. The salt 20 can be added to the film-forming composition before or during the process of forming the water-soluble film. It may be desirable in such an embodiment to add the salt during the process of forming the water-soluble film (e.g., such as by adding the salt to a partially formed film, such as a film that has been cast, but not dried) so that the salt will be distributed more closely to at least one of said first and second surfaces than throughout the thickness of said water-soluble film after the film is formed. In order to make such a film, the ingredients described above are combined in the manner described herein, and the water-soluble film 10 is formed using any of the processes available for making films. Suitable films can, for example, be prepared by one or more of the following film forming methods: coating, laminating, casting, blow molding, and/or extrusion or blow extrusion of the film-forming material.

In another embodiment, the salt can be added to the water-soluble film 10 after the film is used in a product. For example, if the water-soluble film 10 is used to form a water-soluble pouch that contains a composition, the salt can be added to the film on at least a portion of the surface of the water-soluble pouch. This can be done in several different manners. Several non-limiting examples of such a method are described below. Another alternative for such a method is to at least partially immerse, or fully immerse, the product (e.g., the pouches) in a concentrated salt solution.

In another embodiment, the method of making the water-soluble film 10 comprises forming a multi-layer water-soluble film. The multi-layer water-soluble film can comprise two or more layers (e.g., 3, 4, 5 layers, etc.). The term "layer", as used herein, not only encompasses discrete layers, but also encompasses coatings. Thus, a coating may also be considered to be a layer, unless indicated otherwise. The multi-layer water-soluble film has at least one outer layer that has a salt incorporated therein or distributed thereon. (In other embodiments, it is also possible to create a multi-layer film in which the layer that has a salt incorporated therein or distributed thereon comprises an inner layer of the multi-layer film.) Such multi-layer films can be made in a number of different manners.

Figure 2:
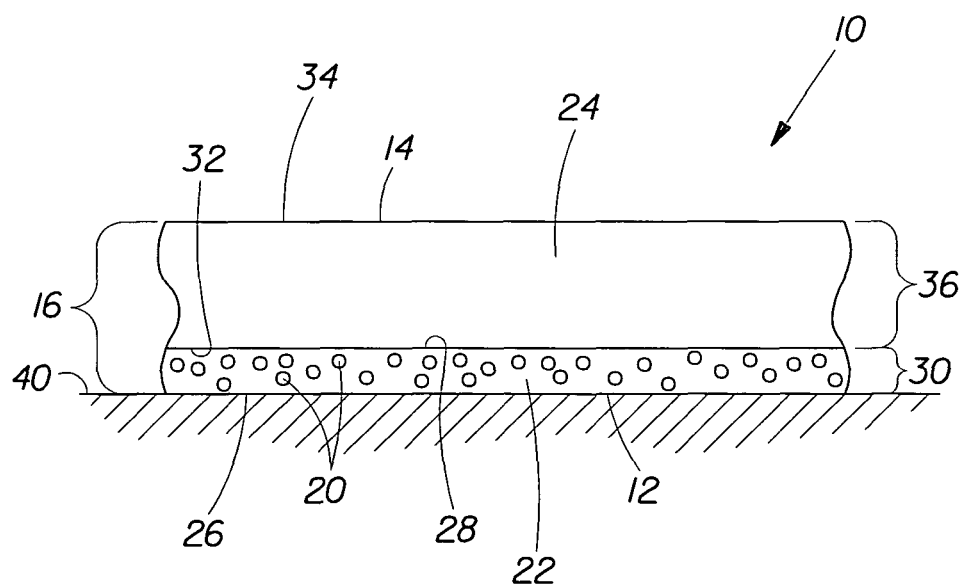
FIG. 2 is a fragmented schematic side view of method of making a water-soluble film having a layer on the outside surface thereof with a salt incorporated into the same.

FIG. 2 shows one non-limiting embodiment of a schematic side view of a film 10 that has one or more layers that form the surface thereof with a salt incorporated into the same. In the embodiment shown in FIG. 2, the film 10 comprises two layers. These will be referred to as first layer 22 and second layer 24. As shown in FIG. 2, the multi-layer water-soluble film 10 is formed with the first layer 22 facing downwardly on a surface, such as a casting surface 40.

The first layer 22 comprises a first surface 26, a second surface 28, and has a thickness 30 between the first and second surfaces. The second layer 24 comprises a first surface 32, a second surface 34, and has a thickness 36 between the first and second surfaces. The first and second layers 22 and 24 are combined together so that the first surface 32 of the second layer 24 is adjacent to, and joined to, the second surface 28 of the first layer 22. The first surface 26 of the first layer 22 forms the first surface 12 of the multi-layer film 10, and the second surface 34 of the second layer 24 forms the second surface 14 of the multi-layer film 10. The salt 20 is distributed within the thickness 30 of the first layer 22.

The multi-layer film 10 shown in FIG. 2 can be formed in any suitable manner. In one embodiment, the multi-layer film 10 is formed by preparing a first water-soluble film-forming composition that will be used to form the first layer 22. The first water-soluble film-forming composition comprises a first concentration of one or more salts 20. The first water-soluble film-forming composition with salt 20 therein is formed into the first layer 22. The first water-soluble film-forming composition with salt 20 can be formed into the first layer 22 in any suitable manner. The first layer 22 can, for example, be formed by one or more of the following film forming methods: casting, blow molding, and/or extrusion or blow extrusion of the film-forming material, or combinations thereof.

In the embodiment shown in FIG. 2, the first layer 22 is formed by casting the first water-soluble film-forming composition on a suitable casting surface 40. The film-forming composition may be cast when it is at an elevated temperature, or is heated. The film-forming composition may be at any suitable temperature when it is cast. In one non-limiting embodiment when the film is made in a laboratory, the film-forming composition is at a temperature of about 165° F. (about 74° C.) when it is cast. In a full-scale, continuous film-making process, it may be desirable for the film-forming composition to be cast at higher temperatures (e.g., higher than about 165° C. (about 74° C.)). The casting surface 40 can comprise any surface that is suitable for casting such films, and can include belts or drums typically used in the industry for this purpose. To make the film in a laboratory, a piece of glass may be used as the casting surface 40. The first water-soluble film-forming composition can be applied to casting surface 40 in any suitable manner to form the first layer 22. The first layer 22 may be formed on the casting surface 40 by forming a single coating or layer on the casting surface 40, or by sequentially coating or layering the first water-soluble film-forming composition to form a first film 22 of the desired thickness 30.

The second layer 24 is formed from the second water-soluble film-forming composition. The second water-soluble film-forming composition comprises less salt than the first water-soluble film forming composition, or is substantially, or completely, free of salt. The second layer 24 is formed by forming a second film from the second water-soluble film-forming composition, and the second layer 24 is combined with the first layer 22. The second water-soluble film-forming composition can be formed into the second layer 24 in any suitable manner. The second layer 24 can, for example, be formed by one or more of the following film forming methods: casting, blow molding, and/or extrusion or blow extrusion of the film-forming material, or combinations thereof. In the embodiment shown in FIG. 2, the second layer 24 is formed by coating or casting the second water-soluble film-forming composition onto the first layer 22.

The combined layers will form a multi-layer film 10 with salt that is distributed more closely to one surface 12 of the water-soluble film 10. In the embodiment shown in FIG. 2, the first layer 22 containing salt 20 is formed before the second layer 24 that contains less salt or is substantially free of salt. In addition, the first layer 22 containing salt 20 is thinner than the second layer 24 that contains less salt or is substantially free of salt.

There are a numerous alternative embodiments of making the film shown in FIG. 2. These include, but are not limited to the following steps where the steps of the method can be performed in a number of different orders. For example, the different film-forming compositions can be formed in any order. It is not necessary that the first film-forming composition be prepared before the second film-forming composition. In other embodiments, the first layer 22 containing salt 20 can be formed after and/or on top of the second layer 24 that contains less salt or is substantially free of salt. In other embodiments, the first layer 22 containing salt 20 can be thicker than the second layer 24 that contains less salt or is substantially free of salt.

In other embodiments, a multi-layer film can be prepared with more than two layers. In such a case, the method can further comprise providing one or more additional water-soluble film-forming compositions. The one or more additional film-forming compositions may comprising less salt than the first water-soluble film-forming composition, or be substantially free of salt. The method can further comprise forming one or more additional film layers from the one or more additional water-soluble film-forming compositions wherein the one or more additional film is combined with the second film to form a three or more layer multi-layered film. In alternative versions of such an embodiment, the one or more additional film-forming compositions may comprise the same percentage of salt, or more salt than the first water-soluble film-forming composition. In such an alternative embodiment, the layers should be combined so that the layer with the highest concentration of salt is more close to, at least one of said first surfaces (26, 32) and second surfaces (28, 34) of the multi-layer film than throughout the thickness of the multi-layer water-soluble film.

The layers of the multi-layer films described herein can have any suitable thicknesses, and can comprise any suitable portion or percentage of the overall film thickness. The layer containing salt may range in thickness from about 1% to about 80% of the total film thickness 16. For example, the first film layer may comprise from about 1% to about 50%, from about 1% to about 40%, from about 1% to about 30%, from about 1% to about 20%, from about 1% to about 15%, from about 1% to about 10%, and alternatively from about 1% to about 5% of the overall film thickness. Thus, in certain embodiments, the ratio of the thickness of the second layer 24 to the first layer 22 may be greater than 2:1. For example, in one non-limiting embodiment, the overall thickness of the multi-layer film may be about 75 microns, and the first layer 22 may have a thickness of about 10 microns, and the second layer 24 may have a thickness of about 65 microns.

Methods of Making a Water-Soluble Pouch

The water-soluble film 10 described herein can be formed into products and other articles, including but not limited to those in which the water-soluble film is used as a packaging material. Such products include, but are not limited to water-soluble pouches, sachets, and other containers.

Water-soluble pouches and other such containers that incorporate the water-soluble film 10 described herein can be made in any suitable manner known in the art. The water-soluble film 10 can be provided with improved resistance to solubility either before or after forming the same into the final product. In either case, in certain embodiments it is desirable when making such products, that the surface 12 of the film 10 on which the salt 20 is distributed (or the surface which is located more closely to the salt contained within the thickness of the film), forms an outer surface of the product.

There are a number of processes for making water-soluble pouches. These include, but are not limited to processes known in the art as: vertical form-fill-sealing processes, horizontal form-fill sealing processes, and formation of the pouches in molds on the surface of a circular drum. In vertical form-fill-sealing processes, a vertical tube is formed by folding a film. The bottom end of the tube is sealed to form an open pouch. This pouch is partially filled allowing a head space. The top part of the open pouch is then subsequently sealed together to close the pouch, and to form the next open pouch. The first pouch is subsequently cut and the process is repeated. The pouches formed in such a way usually have pillow shape. Horizontal form-fill sealing processes use a die having a series of molds therein. In horizontal form-fill sealing processes, a film is placed in the die and open pouches are formed in these molds, which can then be filled, covered with another layer of film, and sealed. In the third process (formation of pouches in molds on the surface of a circular drum), a film is circulated over the drum and pockets are formed, which pass under a filling machine to fill the open pockets. The filling and sealing takes place at the highest point (top) of the circle described by the drum, e.g. typically, filling is done just before the rotating drum starts the downwards circular motion, and sealing just after the drum starts its downwards motion.

In any of the processes that involve a step of forming of open pouches, the film can initially be molded or formed into the shape of an open pouch using thermoforming, vacuum-forming, or both. Thermoforming involves heating the molds and/or the film by applying heat in any known way such as contacting the molds with a heating element, or by blowing hot air or using heating lamps to heat the molds and/or the film. In the case of vacuum-forming, vacuum assistance is employed to help drive the film into the mold. In other embodiments, the two techniques can be combined to form pouches, for example, the film can be formed into open pouches by vacuum-forming, and heat can be provided to facilitate the process. The open pouches are then filled with the composition to be contained therein.

The filled, open pouches are then closed, which can be done by any method. In some cases, such as in horizontal pouch-forming processes, the closing is done by continuously feeding a second material or film, such as a water-soluble film, over and onto the web of open pouches and then sealing the first film and second film together. The second material or film can comprise the water-soluble film 10 described herein. It may be desirable for the surface of the second film on which the salt is distributed (or which is located more closely to the salt contained within the thickness of the film), to be oriented so that it forms an outer surface of the pouch.

In such a process, the first and second films are typically sealed in the area between the molds, and, thus, between the pouches that are being formed in adjacent molds. The sealing can be done by any method. Methods of sealing include heat sealing, solvent welding, and solvent or wet sealing. The sealed webs of pouches can then be cut by a cutting device, which cuts the pouches in the web from one another, into separate pouches. Processes of forming water-soluble pouches are further described in U.S. patent application Ser. No. 09/994,533, Publication No. US 2002/0169092 A1, published in the name of Catlin, et al.

Articles of Manufacture

The present invention may also include articles of manufacture (or "articles") or products comprising a product composition and a water-soluble film, which may be formed into a container, such as a pouch, a sachet, a capsule, a bag, etc. to hold the product composition. The surface of the water-soluble film with the salt distributed more closely thereto may be used to form an outside surface of the container. The water-soluble film may form at least a portion of a container that provides a unit dose of the product composition.

For simplicity, the articles of interest herein will be described in terms of water-soluble pouches, although it should be understood that discussion herein also applies to other types of containers.

The pouches formed by the foregoing methods, can be of any form and shape which is suitable to hold the composition contained therein, until it is desired to release the composition from the water-soluble pouch, such as by immersion of the water-soluble pouch in water. The pouches can comprise one compartment or two or more compartments (that is, the pouches can be multi-compartment pouches). In one embodiment, the water-soluble pouch may have two or more compartments that are in a generally superposed relationship and the pouch comprises upper and lower generally opposing outer walls, skirt-like side walls, forming the sides of the pouch, and one or more internal partitioning walls, separating different compartments from one another. If the composition contained in the pouches comprises different forms or components, the different components of the composition may be contained in different compartments of the water-soluble pouch and may be separated from one another by a barrier of water-soluble material.

The pouches or other containers may contain a unit dose of one or more compositions for use as laundry detergent compositions, automatic dishwashing detergent compositions, hard surface cleaners, stain removers, fabric enhancers and/or fabric softeners, and new product forms where contact with small amounts of water could create premature pouch dissolution, unwanted pouch leakage and/or undesirable pouch-to-pouch stickiness. The compositions in the pouches can be in any suitable form including, but not limited to: liquids, liqui-gels, gels, pastes, creams, solids, granules, powders, etc. The different compartments of multi-compartment pouches may be used to separate incompatible ingredients. For example, it may be desirable to separate bleaches and enzymes into separate compartments. Other forms of multi-compartment embodiments may include a powder-containing compartment in combination with a liquid-containing compartment. Additional examples of multiple compartment water-soluble pouches are disclosed in U.S. Pat. No. 6,670,314 B2, Smith, et al.

The water-soluble pouches may be dropped into any suitable aqueous solution (such as hot or cold water), whereupon water-soluble film material forming the water-soluble pouches dissolves to release the contents of the pouches. The film and the pouches described herein may be soluble or dispersible in water, and have a water-solubility of at least about 50%, alternatively at least about 75%, or even at least about 95%, by weight. The solubility of the film and the pouches may be measured by a method of adding either a piece of film, or one of the pouches (including the film comprising the same) to distilled water, stirring the distilled water containing either the film or pouch vigorously using a magnetic stirrer, and filtering the water containing the film or pouch using a glass-filter with a maximum pore size of 20 microns. The dry weight of material collected on the filter is then compared to the weight of the initial sample, and is expressed as a percentage.

EXAMPLES

The following examples are furnished to assist in providing a complete understanding of the invention. It will be understood that the invention is not limited to the examples or to the procedures, materials, proportions and conditions set forth therein, which are merely illustrative. Unless otherwise stated, the proportions are by weight.

Example 1

Providing a Pouch Made from a Water-Soluble Film with Improved Resistance to Solubility In this example, a pre-made water-soluble pouch made from a water-soluble film is provided with improved resistance to solubility prior to being immersed in water. This is accomplished by dusting the outer surface of the pouch film with a salt.

A commercially available water-soluble pouch containing a unit dose of liquid laundry detergent known as ARIEL® LIQUITABS™ is obtained from The Procter & Gamble Company in Europe. The contents of the ARIEL® LIQUITABS™ water-soluble pouch are contained in a water-soluble film that comprises at least some PVOH.

The outer surface of the ARIEL® LIQUITABS™ water-soluble pouch is dusted with sodium sulfate powder that passes through either number 120 or number 270 size sieves. The amount of salt added to the water-soluble film can be expressed in terms of the amount of salt added onto the film as a percentage of the initial film weight (before the salt is added). The amount of salt that is added to the film is between about 2.5% and about 7%, of the initial film weight. The improved resistance to solubility when contacted by small amounts of water of three sets of samples created in this manner is shown in Table 2. If the samples are described as being "deformed", they deform, but do not leak.

Example 2

Providing a Pouch Made from a Water-Soluble Film with Improved Resistance to Solubility In this example, a water-soluble pouch made from a water-soluble film is provided with improved resistance to solubility prior to being immersed in water. This is accomplished by at least partially dissolving the outer surface of the water-soluble film and then dusting the same with a salt.

Another ARIEL® LIQUITABS™ water-soluble pouch containing a unit dose of liquid laundry detergent is obtained. The outer surface of the ARIEL® LIQUITABS™ water-soluble pouch is wetted and dissolved part of the way into the depth of the film by applying water to the surface of the film surface using a wetting means (e.g. using a wet sponge, water mist; water spray, etc). The wetted outer surface of the pouch is then dusted with sodium sulfate powder with an average particle size of less than or equal to about 150 microns. The pouch is then allowed to dry until the surface is dry to the touch. The excess sodium sulfate is removed by buffing the surface of the water-soluble pouch by contact with a towel, and the formation of the pouch with salt imbedded into the outer surface is complete.

The same steps described in Examples 1 and 2 above may also be used to provide a multi-compartment water-soluble pouch made from a water-soluble film with improved resistance to solubility. This can be done in the same manner as described in Examples 1 and 2 on a multi-compartment water-soluble pouch, such as a CASCADE® ACTIONPAC™ multi-compartment water-soluble pouch containing a unit dose of automatic dishwasher detergent obtained from The Procter & Gamble Company in the United States.

Example 3

Formation of a Multi-Layer Water-Soluble Film

In this Example, a multi-layer water-soluble film comprising two layers is formed. Two solutions are made using MonoSol's M8630™ film. The MonoSol M8630™ film is dissolved into de-ionized water at 75-80° C. to form a solution. The two solutions comprise: a solution that contains no salt (Solution 1), and a solution that contains sodium sulfate (Solution 2). The compositions of these solutions are listed in Table 1.

TABLE 1

| | Composition of Solutions | |
|---|---|---|
| Material | Solution 1 Weight (gm) | Solution 2 Weight (gm) |
| M8630 ™ Film | 254.78 | 228.20 |
| Sodium Sulfate | 0 | 10.68 |
| Water | 917.2 | 936.02 |
| Total | 1171.98 | 1174.90 |

Using a GARDCO™ Automatic Drawdown machine available from the Paul N. Gardner Company, Inc., Pompano Beach, Fla., U.S.A., with a #26 casting bar and a casting speed setting of 6.0, Solution 2 is cast into a film on a glass plate or glass slide. After casting, the slide is placed in an oven at 165° F. (74° C.) for 20 minutes. After 20 minutes at 165° F. (74° C.), the glass slide is removed from the oven and is placed back onto the GARDCO™ Automatic Drawdown machine. The thickness of this first casting is approximately 20 microns.

Using a #42/76 casting bar and a casting speed setting of 12.4, Solution 1 is cast into a film on top of the film on the glass slide produced using Solution 2. The glass slide is then placed in an oven at 165° F. (74° C.) for one hour. After one hour, the glass slide with the layers of water-soluble cast material thereon is removed from the oven, and placed in a room at 21° C. with a 40% RH for 24 hours to form a multi-layer film. The resulting thickness of the final multi-layer film is approximately 72 microns.

The water-soluble film formed herein may be used as a pouch material to form any suitable container (such as a water-soluble pouch) that holds any suitable product composition.

Water Droplet Resistance Testing Method—Leak Test

The water droplet resistance test is performed by:
a) providing a water-soluble pouch;
b) applying a 0.001 to 0.01 ml room temperature water droplet to the center of one of the outer surfaces of the water-soluble pouch;
c) waiting 10 minutes, and
d) determining whether the water-soluble pouch leaks.

Pouch-to-Pouch Stickiness Test

The pouch-to-pouch stickiness test is performed by:
a) providing a test water-soluble pouch;
b) applying a 0.03 ml room temperature water droplet to the center of the outer film surface of the test water-soluble pouch;
c) providing a water-soluble pouch that does not comprise the water-soluble film described herein (an "unsalted" control pouch);
d) placing the unsalted, water-soluble pouch on top of the wetted area of the test water-soluble pouch surface;
e) waiting 10 seconds; and
f) lifting the unsalted, water-soluble pouch six inches (15 cm); and
g) determining whether the test water-soluble pouch sticks to the unsalted, water-soluble pouch.

All tests are conducted under standard laboratory conditions, unless otherwise indicated.

Table 2 shows the results from a water droplet resistance test for a commercially available liquid laundry pouch (such as, ARIEL® LIQUITABS™ obtained from The Procter & Gamble Company in Europe). Salt add-on weights are given as a percentage of film weight. The results indicate that the water-soluble pouches are resistant to premature pouch dissolution, unwanted pouch leakage and/or undesirable pouch-to-pouch stickiness since the salted, water-soluble pouches show over a 75% reduction in immediate leakage versus unsalted, water-soluble pouches.

TABLE 2

Water Droplet Resistance Testing

| Sample | 1 | 2 | 3 |
| --- | --- | --- | --- |
| Unsalted | Leaked | Leaked | Leaked |
| 7.0 wt % Salt No. 120 Sieve | Deformed | Deformed | Deformed |
| 4.0 wt % Salt No. 120 Sieve | Leaked | Deformed | Deformed |
| 2.5 wt % Salt No. 120 Sieve | Deformed | Deformed | Leaked |
| 7.0 wt % Salt No. 270 Sieve | Deformed | Deformed | Deformed |
| 4.0 wt % Salt No. 270 Sieve | Deformed | Deformed | Deformed |
| 2.5 wt % Salt No. 270 Sieve | Deformed | Leaked | Leaked |
| 4.0 wt % Spray Dried (No. 120) | Deformed | Deformed | Deformed |
| 7.0 wt % Spray Dried (No. 120) | Deformed | Deformed | Deformed |

It is also observed that $Na_2SO_4$ powdering reduces pouch-to-pouch stickiness. When a 0.03 ml water droplet is applied to the surface of a first unsalted, water-soluble pouch (i.e. CASCADES ACTIONPAC™ obtained from The Procter & Gamble Company in the United States), and then a second unsalted, water-soluble pouch is placed on top of the first unsalted, water-soluble pouch for 10 seconds, the two unsalted, water-soluble pouches become so strongly bound together that they cannot be peeled apart without tearing the water-soluble pouch material or water-soluble film. When this same procedure is performed on salted, water-soluble pouches, the salted, water-soluble pouches either do not stick or are easily shaken apart.

The present invention may provide numerous advantages in addition to providing the film with resistance to solubility when contacted with small amounts of water. Adding salt to the film may allow thinner films to be constructed and/or films with greater solubility when immersed in water, since it is not as necessary to design the films with additional thickness for the purpose of providing resistance to solubility when contacted with small amounts of water. Providing films with resistance to solubility when contacted with small amounts of water in the manner described herein retains the physical properties (e.g., solubility, flexibility, extensibility, and the like) and aesthetic properties (e.g., transparency or translucency, if transparent or translucent), as well as the maintenance of these properties upon aging of the films to be substantially retained. It should be understood, however, that invention(s) described in the claims are not required to provide any of such advantages unless specifically stated therein.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

It should be understood that every maximum numerical limitation given throughout this specification would include every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

While particular embodiments of the subject invention have been described, it will be obvious to those skilled in the art that various changes and modifications of the subject invention can be made without departing from the spirit and scope of the invention. It will be clear to those skilled in the art that various changes and modifications may be made without departing from the scope of the invention and the invention is not to be considered limited to the embodiments and examples that are described in the specification.

The invention claimed is:

1. A water-soluble film that is resistant to solubility prior to being immersed in water and is completely soluble after being immersed in water, said water-soluble film having a first surface, a second surface, and a thickness between said first and second surfaces, said water-soluble film comprising:
   a layer comprising a primary water-soluble film-forming material that at least partially comprises polyvinyl alcohol; and
   a salt solution layer distributed on at least one of said first and second surfaces of said water-soluble film, said salt is selected from the group consisting of: sodium tripolyphosphate, potassium tripolyphosphate and mixtures thereof; and
   wherein said water-soluble film forms a container.

2. The water-soluble film of claim 1 wherein said primary water-soluble film-forming material comprises from about 50% to about 95% of said water-soluble film, by weight, on a dry basis after said film is formed.

3. The water-soluble film of claim 1 wherein said salt solution layer comprises from about 1% to about 15% of said water-soluble film, by weight.

4. The water-soluble film of claim 1 further comprising a plasticizer selected from the group consisting of: glycerol, glycerin, diglycerin, hydroxypropyl glycerine, sorbitol, ethylene glycol, diethylene glycol, triethylene glycol, tetraethylene glycol, propylene glycol, polyethylene glycols, neopentyl glycol, trimethylolpropane, polyether polyols, ethanolamines, and mixtures thereof.

5. A multi-layer water-soluble film that is resistant to solubility prior to being immersed in water and is completely soluble after being immersed in water, said water-soluble film having a first surface, a second surface, and a thickness between said first and second surfaces, said multi-layer water-soluble film comprising:

a first film layer comprising from about 50% to about 95% of a film-forming composition comprising a primary water-soluble film-forming material that at least partially comprises polyvinyl alcohol and optionally a plasticizer; and a second film layer comprising a salt selected from the group consisting of sodium tripolyphosphate, potassium tripolyphosphate, and mixtures thereof on its surface; and wherein said multi-layer water-soluble film forms a container.

* * * * *